United States Patent [19]

Hedberg

[11] 4,152,759
[45] May 1, 1979

[54] FREQUENCY CONVERTER

[75] Inventor: John B. G. Hedberg, Göteborg, Sweden

[73] Assignee: AB SVETSIA, Askim, Sweden

[21] Appl. No.: 795,502

[22] Filed: May 10, 1977

[30] Foreign Application Priority Data

May 12, 1976 [GB] United Kingdom ............... 19533/76

[51] Int. Cl.² ............................................. H02M 5/45
[52] U.S. Cl. ..................................... 363/160; 363/27; 363/58; 363/136
[58] Field of Search ....................... 363/27, 28, 55–58, 363/96, 135, 136, 159, 160, 169; 219/130.1

[56] References Cited

U.S. PATENT DOCUMENTS 3,624,483  11/1971  Genuit ..................................... 363/28
4,063,306  12/1977  Perkins et al. ...................... 363/56 X Primary Examiner—William M. Shoop
Attorney, Agent, or Firm—Fleit & Jacobson

[57] ABSTRACT

A frequency converter of the series-capacitor type is made substantially insensitive to changes in output load by providing the same with means for limiting the voltage across the transformer and load capacitor or capacitors thereof to a pre-determined value.

13 Claims, 11 Drawing Figures

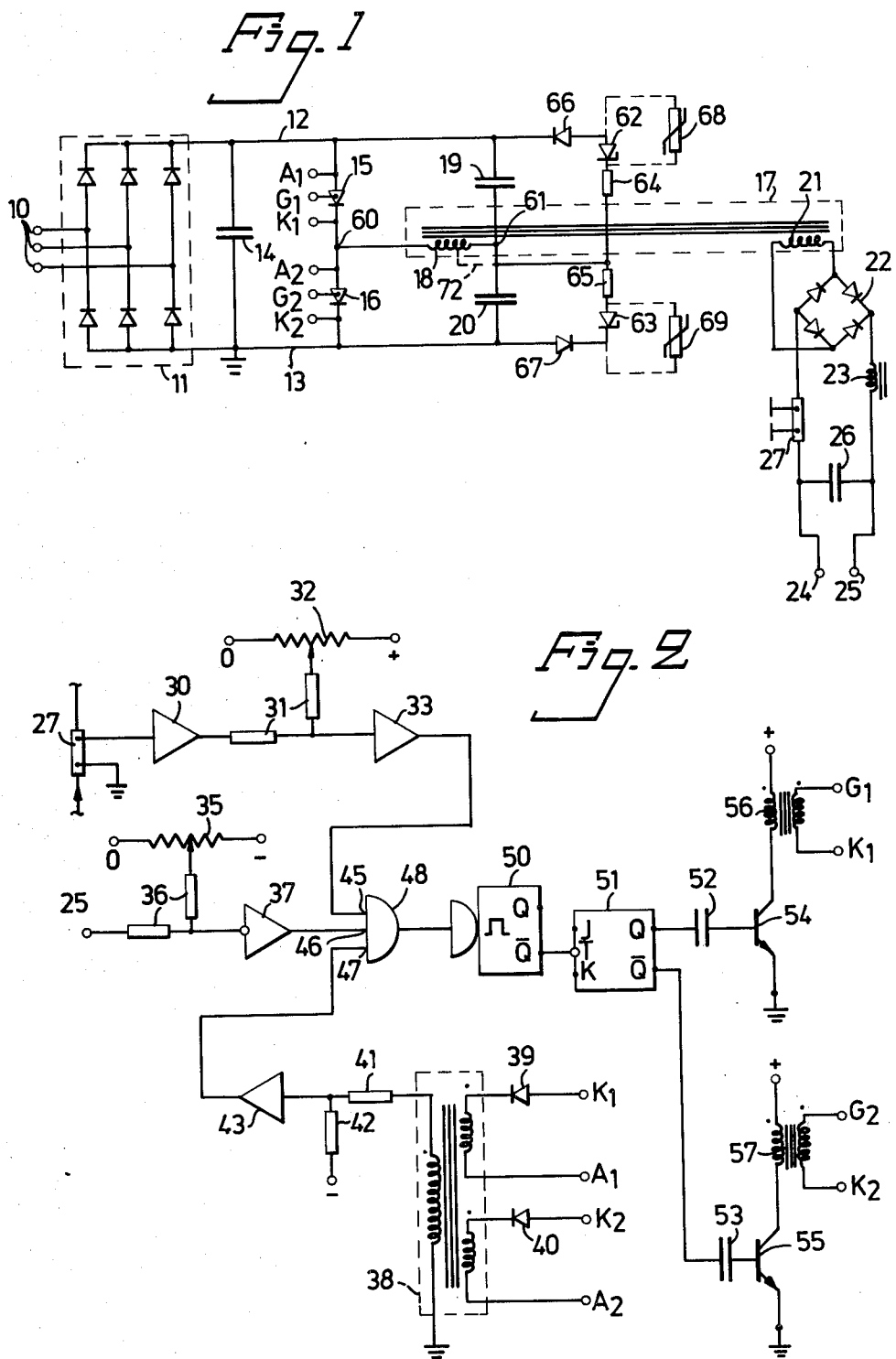

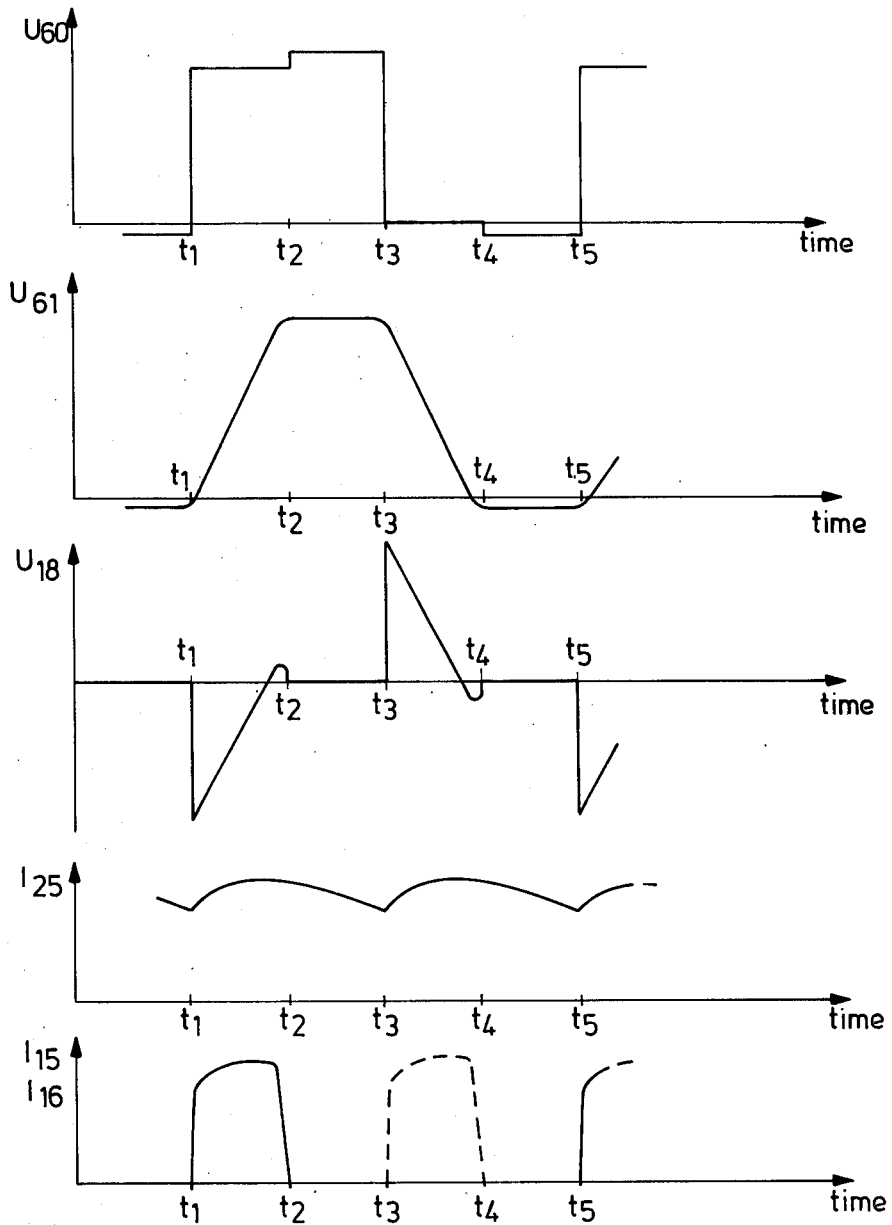

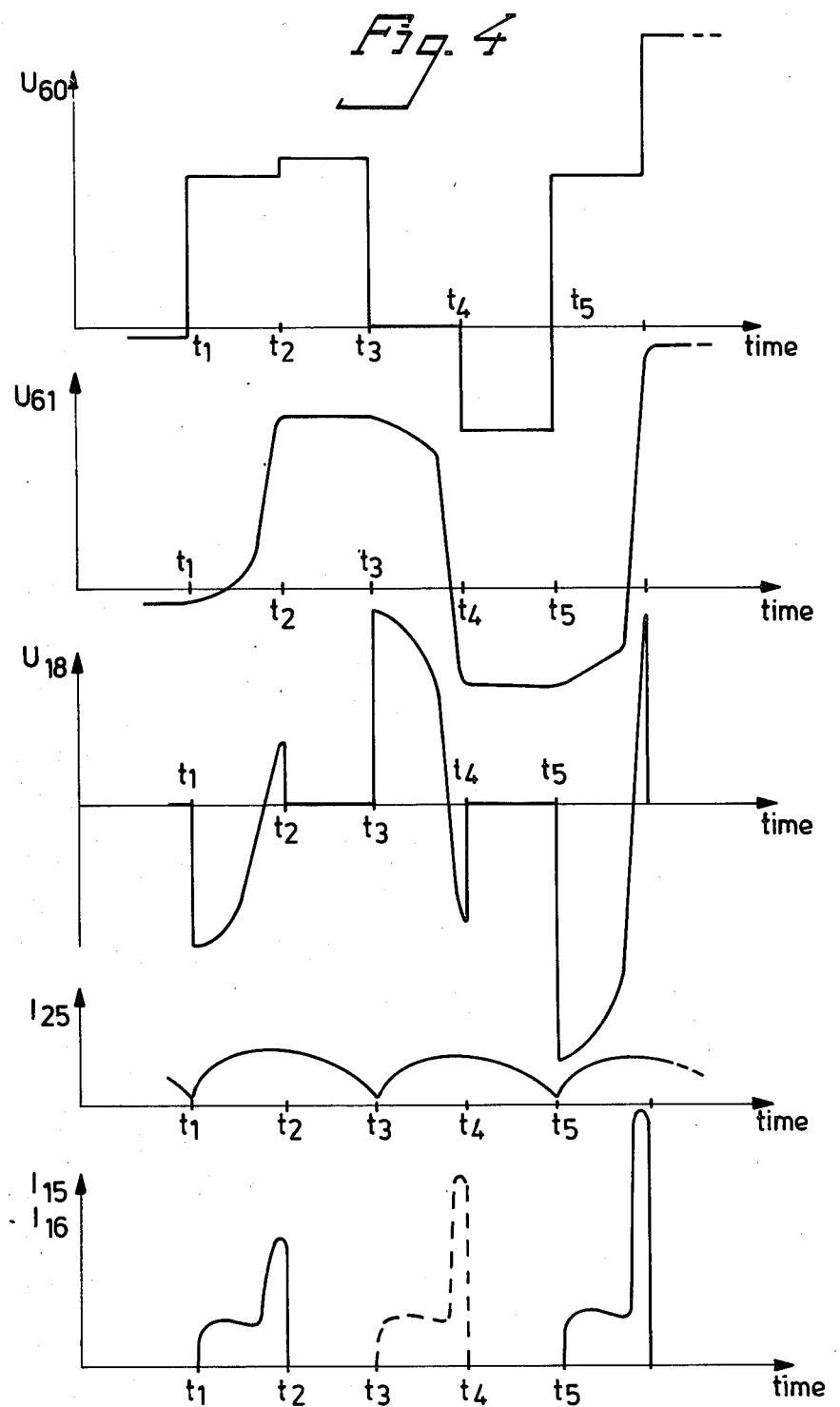

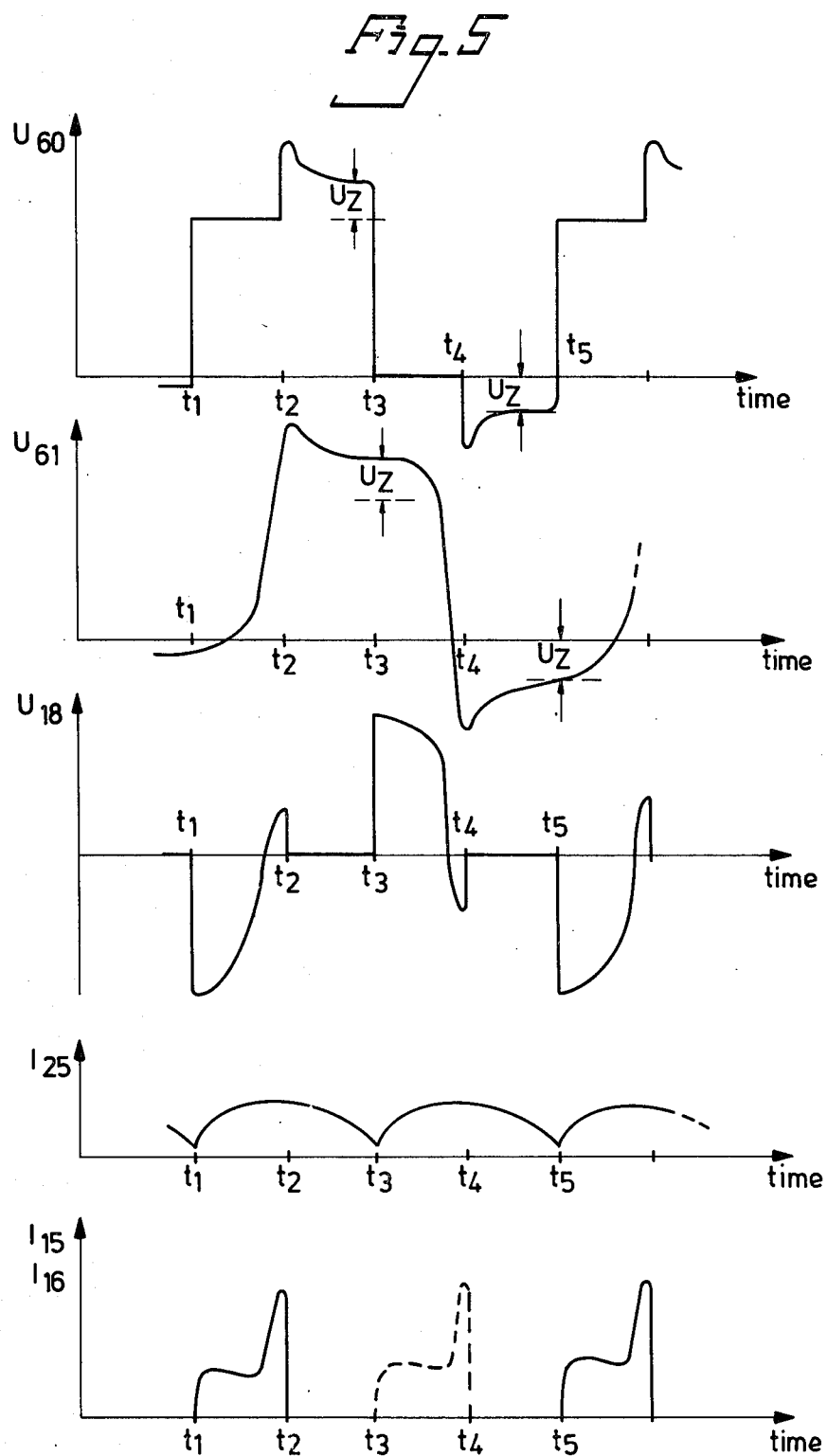

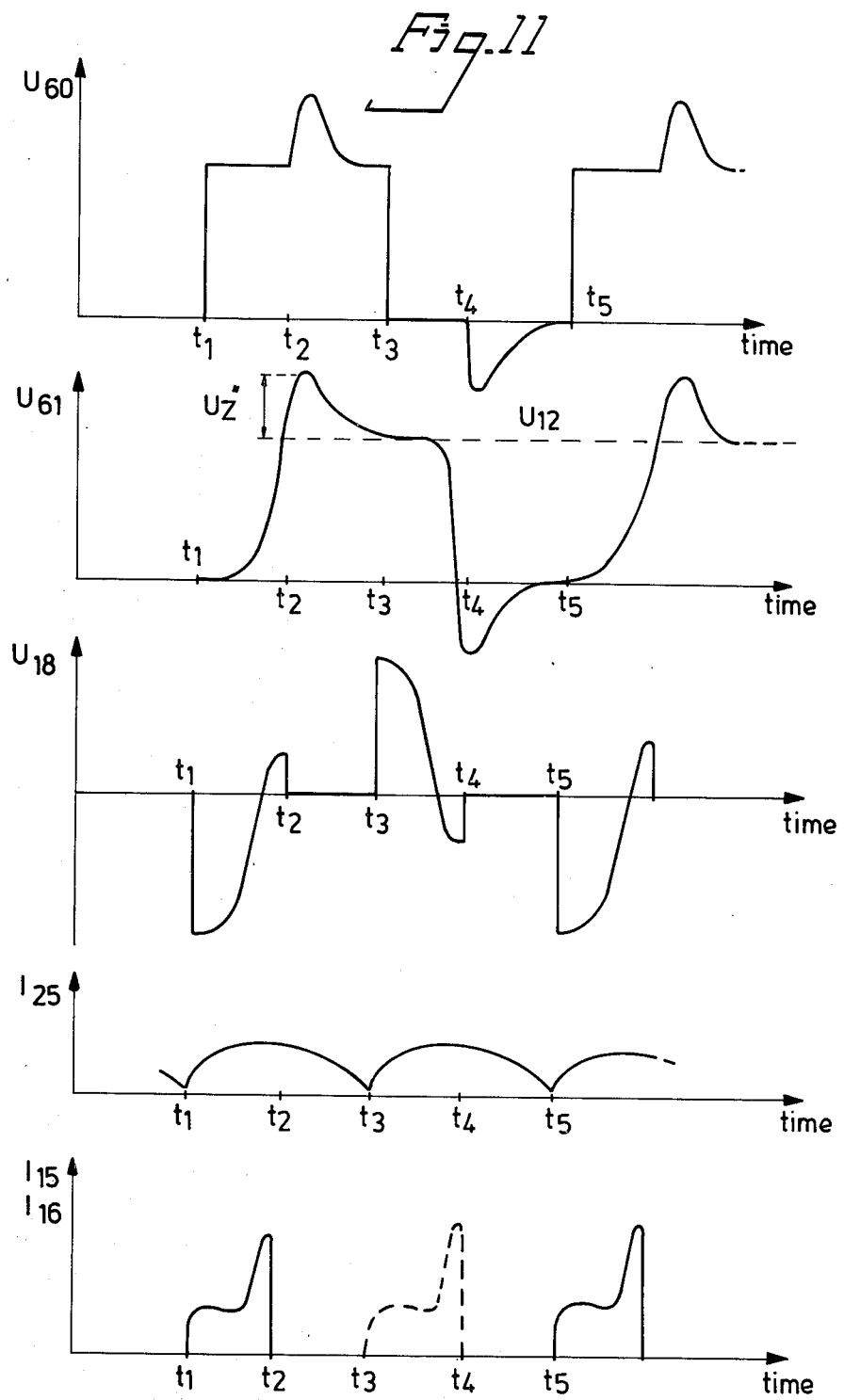

FREQUENCY CONVERTER

The present invention relates to a frequency converter of the series-capacitor type with small internal damping and with thyristors as switching elements.

One advantage afforded by such frequency converters is that they are of extremely simple construction, are relatively light in weight, are cheap to manufacture and are capable of dealing with high powers. One disadvantage, however, is that such frequency converters are sensitive to changes in load; in particular problems arise when the output current is low and/or the output voltage is high. This renders such a frequency converter unsuitable as a source of welding current, for example, since variations in load are often experienced in electric welding operations. Because of this it has been necessary, when using a frequency converter as a source of welding current, to design the converter so that it has high internal losses which in itself dampens the excess voltages which could otherwise occur with the small internal damping in the frequency converter when the load thereon is low. The efficiency of a frequency converter thus designed, however, is very poor. Alternatively, the transformer of the frequency converter can be designed to deal with low loads without becoming saturated, which increases manufacture costs and the weight of the transformer, however.

An object of the present invention is to provide an improved frequency converter of the type mentioned in the introduction having but small weight and high efficiency and being substantially insensitive to changes in load.

Accordingly, this invention consists in a frequency converter of the series-capacitor type having small internal damping and comprising switching elements in the form of thyristors, said converter further comprising a transformer having a primary winding and at least one secondary winding, said primary winding being connected in series to at least one load capacitor, and voltage limiting means effective to limit the voltage across the transformer and said at least one load capacitor to a predetermined voltage value.

Preferably in a frequency converter according to the invention the voltage limiting means comprises circuits connected between the common point of the capacitor circuit and the primary winding of the transformer or between a point on the primary winding of the transformer and a respective one of the input lines of the supply voltage, which circuits become conductive at a voltage which is equal to the difference between said predetermined voltage value and the supply voltage. Further the said circuits preferably comprise at least one zener diode or varistor. Alternatively the voltage limiting means comprises a circuit connected in parallel with the primary winding of the transformer which circuit becomes conductive at said predetermined voltage value. In this case said circuit preferably comprises two zener diodes connected in series opposition or a varistor.

Conveniently, the voltage limiting means comprises a circuit connected in parallel with at least part of the primary winding of the transformer, and means for making said circuit conductive at said predetermined voltage value. Preferably said means for making the circuit conductive comprises two zener diodes connected in series opposition or a varistor in said circuit.

In accordance with a further embodiment the voltage means comprises an additional secondary winding having a number of turns which is equal to or less than the number of turns of the primary winding, and wherein the end terminals of the additional secondary winding are connected via a rectifying bridge to a respective one of the input lines of the supply voltage.

So that the invention will be more readily understood and optional features thereof made apparent, a number of exemplary embodiments thereof will be described with reference to the accompanying schematic drawings, in which:

FIG. 1 is a circuit diagram of a frequency converter including voltage-limiting means according to the invention;

FIG. 2 is a circuit diagram of a control circuit intended for use in conjunction with the frequency converter of FIG. 1;

FIGS. 3 and 4 show voltage and current curves which would occur in the frequency converter during normal operation and operation at low loads if no voltage limiting means were provided;

FIG. 5 shows corresponding voltage and current curves occurring with a frequency converter according to FIGS. 1 and 2 operating at low load and being provided with a voltage limiting means according to FIG. 1 or FIG. 7;

FIG. 11 shows corresponding voltage and current curves occurring with a frequency converter according to FIGS. 1 and 2 subjected to a low load and provided with a voltage limiting means according to FIG. 10.

Figure 6:
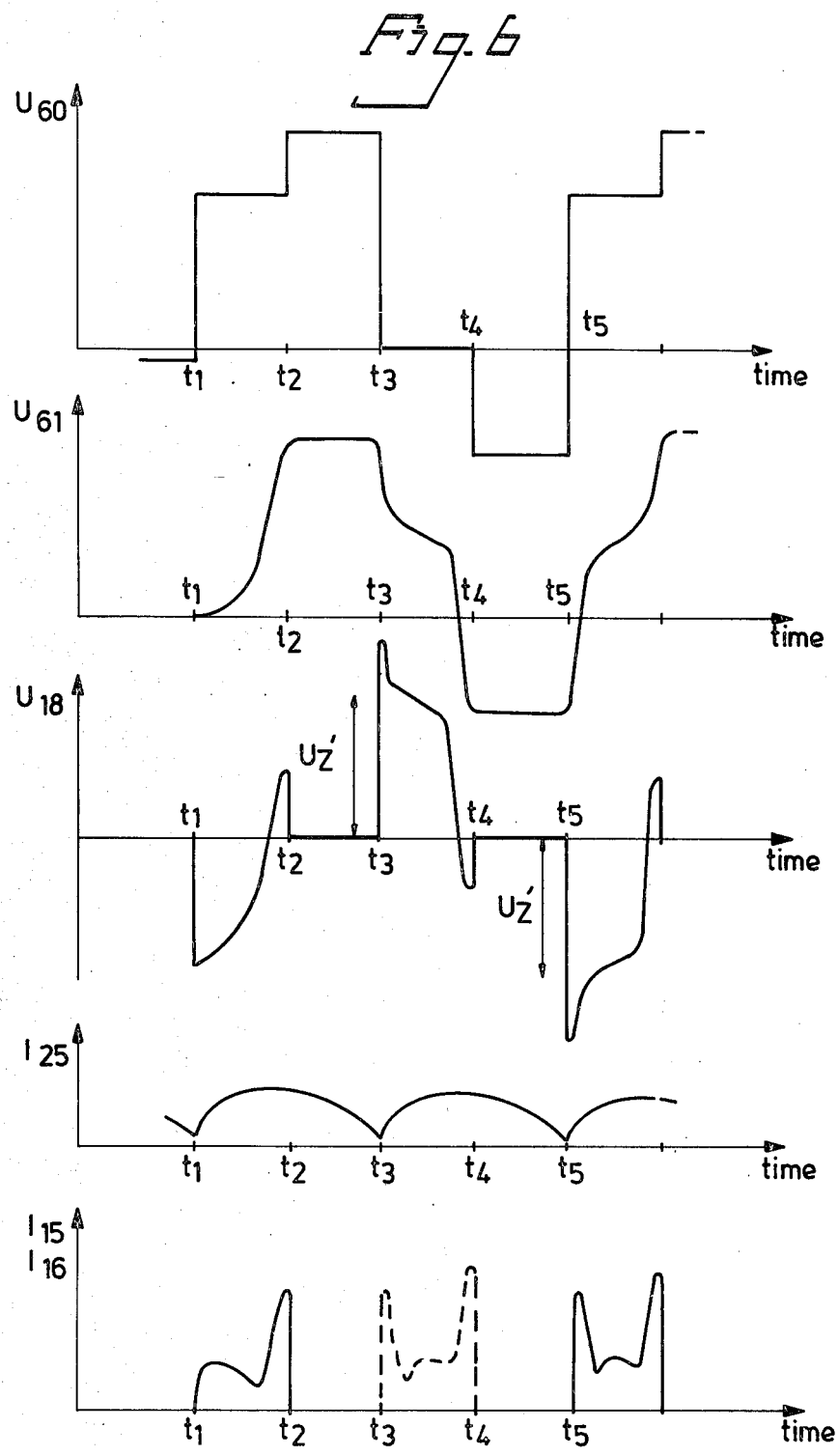
FIG. 6 shows corresponding voltage and current curves occurring with a frequency converter according to FIGS. 1 and 2 subjected to a low load and provided with a voltage limiting means according to FIGS. 8 and 9.

The frequency converter shown in FIG. 1 is connected at 10 to a three-phase alternating current mains supply. The input current is rectified in a six-element full-wave rectifier 11, the rectified output voltage on the lines 12, 13 being smoothed by a buffer capacitor 14, the converter having a low input impedance as a consequence of the shown arrangement of elements 11 to 14.

The switching elements of the frequency converter are thyristors 15, 16, which are controlled so as to be conductive alternately. The transformer of the frequency converter is generally shown at 17. The transformer has a primary winding 18 connected in series with load capacitors 19, 20, and a secondary winding 21 connected to terminals 24, 25 via a rectifier bridge 22 and a choke 23. The two terminals of a load, such as a welding electrode holder and a workpiece to be welded can be connected between the terminals 24, 25. In the embodiment of FIG. 1, there is connected between the terminals 24, 25 a capacitor 26 which, when the frequency converter is used as a source of welding current, can be used for maintaining a desired open-circuit voltage. A shunt 27 is provided for measuring the load current, the output voltage across the shunt being used to control the frequency converter, as hereinafter described with reference to FIG. 2.

In the control circuit shown in FIG. 2, one terminal of the shunt 27 is connected to earth and the other terminal is connected to an amplifier 30 which amplifies the signal of the shunt 27 from a millivolt level to a volt level. The amplifier 30 is connected, via comparison resistors 31, to a current adjusting device 32 in the form of a potentiometer, and to an amplifier 33 which serves as a level discriminator. The current adjusting device 32 serves to set the desired output current from the frequency converter. For setting the desired maximum output voltage from the frequency converter, there is provided a voltage adjusting device 35 in the form of a potentiometer which is connected, via comparison resistors 36, to the terminal 25 of the frequency converter and to an amplifier 37 which serves as a level discriminator. For controlling the states of the thyristors 15, 16 there is provided a sensing circuit comprising a transformer 38 whose primary is connected via diodes 39, 40 to the anodes $A_1$, $A_2$ and the cathodes $K_1$, $K_2$ of the thyristors 15, 16. One end of the secondary winding of the transformer 38 is earthed and the other is connected to a comparison circuit comprising two resistors 41, 42, the resistor 42 having one end connected to a constant negative voltage. The junction between resistors 41, 42 is connected to an amplifier 43 which serves as a level discriminator and the change-over point of which is determined by the resistors 41, 42 and said constant negative voltage. Each of the amplifiers 33, 37 and 43 is connected to a respective one of the inputs 45, 46, 47 of an AND gate 48 which operates in a known manner. Thus, the AND gate 48 can only provide an output signal when the output signal from the amplifier 33 is positive, i.e. when the load current measured by the shunt 27 is less than the value for which the adjusting device 32 is set. Correspondingly, it is necessary for the output signal from the amplifier 37 to be positive, i.e. for the load voltage on the terminal 25 to be less than the value set on the adjusting device 35. Finally, the output signal from the amplifier 43 must be positive, which means that the anode voltage of one of the thyristors 15 or 16 is negative in relation to its cathode, which in turn means that both thyristors 15 and 16 are de-energized.

The output of the AND gate 48 is connected to the input of a monostable flip-flop 50 which has a pre-determined pulse period corresponding to the recovery time of the thyristors 15, 16, for example 30 μs. Thus, on the output $\overline{Q}$ of the flip-flop 50 there is obtained a positive voltage pulse for a period of time corresponding to the recovery time of the thyristors 15, 16. The pulse is applied to the trigger input T of a JK flip-flop 51, so that the JK flip-flop 51 changes the states of its outputs at the end of the pulse from the flip-flop 50. The outputs Q, $\overline{Q}$ of the JK flip-flop 51 are connected to the base electrodes of respective transistors 54, 55 via capacitors 52, 53. The emitters of the transistors 54, 55 are connected to earth while their collectors are connected to the primary winding of respective ignition transformers 56, 57 for the thyristors 15, 16. The other ends of the primary windings are connected to a terminal having a pre-determined positive potential. The signals from the outputs of the JK flip-flop 51 will alternately render the transistors 54, 55 conductive via the capacitors 52, 53, for a short period of time determined by the capacitors 52, 53, so that the thyristors 15, 16 alternately receive a short ignition pulse and thereby alternately supply current to the primary winding 18 of the transformer 17 to produce an alternating current whose frequency is determined by the input signals on the inputs 45, 46, 47 of the AND gate 48.

FIG. 3 shows the voltage $U_{60}$, $U_{61}$ at points 60, 61 and the voltage $U_{18}$ across the primary winding 18 of the transformer 17 with normal load on the output of the frequency converter shown in FIGS. 1 and 2. FIG. 3 also shows the output current $I_{25}$ through the terminal 25 and the output currents $I_{15}$ and $I_{16}$ (the latter shown in dashed lines) from the thyristors. In FIG. 3 the reference $t_1$ indicates the point of time when the thyristor 15 is ignited, $t_2$ the point of time when the thyristor 15 is deenergised and obtains a voltage between its anode $A_1$ and cathode $K_1$ as a result of the resonant circuit formed by the primary winding 18 of the transformer 17 and the capacitors 19, 20; $t_3$ the point of time when the thyristor 16 is ignited; and $t_4$ is the point of time when the thyristor 16 is de-energised and its anode becomes negative as a result of said resonant circuit 18, 19, 20. The reference $t_5$ shows the point of time at which the thyristor 15 is re-ignited, whereupon the sequence is repeated provided that the load remains substantially unchanged.

FIG. 4 illustrates corresponding voltage and current curves, when the output current from the frequency converter is low and/or the output voltage high. Thus, it will be seen that, when the output current is low, a relatively long period of time is required to recharge the load capacitors 20, 19. This results in saturation of the transformer 17 with current surges therein as a result thereof. This is shown by the peaks at the trailing edges of the wave-forms showing the thyristors currents $I_{15}$, $I_{16}$. Such saturation always causes overshooting in the transformer voltage $U_{18}$ with a resulting high voltage $U_{61}$ across the capacitors 19, 20. Owing to the fact that the output voltage on the capacitors 19, 20 with the next following pulse (at $t_3$) is high, the next overshooting in the transformer voltage will be further increased, whereby an avalanche effect is obtained for the voltages $U_{60}$, $U_{61}$ and $U_{18}$, resulting in the failure of a component of the frequency converter as a result of excessive voltage. It will therefore be understood that the frequency converter so far described is unable to deal with low currents and/or high voltages on the output thereof. The frequency converter can therefore not operate in the absence of a load when it is being used, for example, as a source of welding current.

Figure 7:
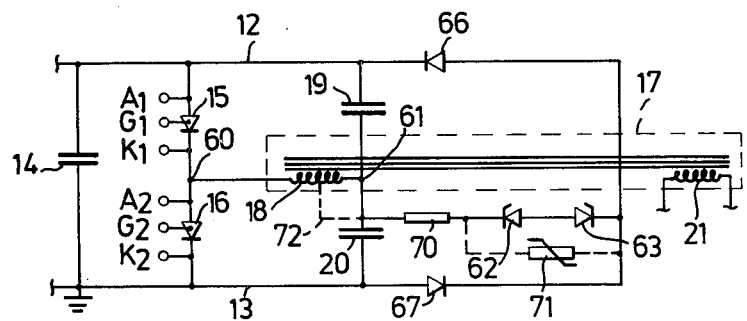
FIGS. 7–10 show modifications of the voltage limiting means according to FIG. 1.

To overcome these disadvantages, the frequency converter is provided with means for limiting the voltage across the primary winding of the transformer 17 and the load capacitors 19, 20 to a predetermined value above the voltage on the input lines 12, 13. In FIG. 1 this voltage-limiting means is shown to comprise two circuits, which include respectively zener diodes 62 and 63, current-limiting protective resistors 64 and 65, and diodes 66 and 67, the diodes 66, 67 blocking current in the forward direction of the zener diodes. The blocking voltage of the zener diodes 62, 63 is selected so as to be somewhat lower than the highest voltage by which the voltage $U_{61}$ at point 61 may exceed the supply voltage on the lines 12, 13. Thus, when the voltage at point 61 exceeds the voltage on line 12 or falls short of the voltage on line 13 by an amount corresponding to the blocking voltage of the zener diodes 62, 63, current can flow through the circuit 64, 62, 66 from the point 61 to the line 12 and with opposite polarity at point 61 flow through the circuit 65, 63, 67 to the line 13. As indicated in dash lines in FIG. 1 the zener diodes 62, 63 may be replaced by varistors 68, 69. FIG. 7 illustrates an alternative embodiment of the voltage-limiting circuit included in FIG. 1. With this modification, the resistors 64, 65 are replaced by single resistor 70. Further the zener diodes 62, 63 are connected in series-opposition, while the diodes 66, 67 are arranged in the manner described with reference to FIG. 1. Further, as indicated in dashed lines, the zener diodes 62, 63 may be replaced by a single varistor 71. As indicated by dashed line 72 in FIGS. 1, 7 and 10, the voltage-limiting circuits may alternatively be connected to a tapping of the primary winding 18 of the transformer 17.

When using any one of the protective circuits illustrated in FIGS. 1 and 7, the voltage and current wave forms shown in FIG. 5 are obtained with a low load, i.e. a low output current and/or high output voltage on the output terminals 24, 25 of the frequency converter. As shown in FIG. 5, the voltage $U_{61}$ occurring at point 61 does not avalanche, but is substantially restricted to a single value which exceeds the voltage lying on the line 12 or 13 by an amount which corresponds to the blocking voltage $U_z$ of the zener diodes 62, 63, with the exception of a relatively low voltage peak of short duration which originates from the voltage drop across the associated protective resistor 64, 65 or 70. It will thus be understood that the current and voltage pulses will not change with time in the avalanche manner shown in FIG. 4.

Figure 8:
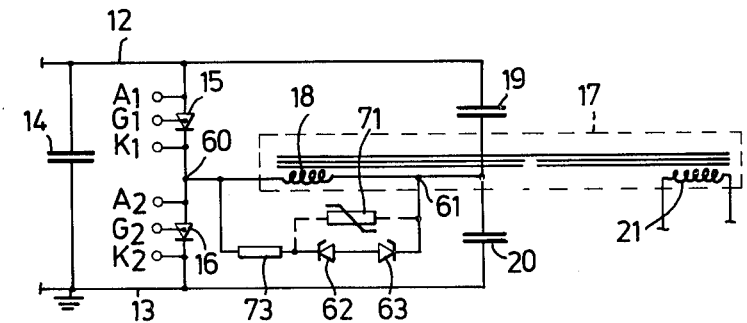

FIG. 8 shows a further modification of the protective circuit. In the FIG. 8 embodiment the protective circuit is connected solely across the primary winding 18 of the transformer 17. In a manner corresponding to that indicated in dashed lines 72 in FIGS. 1 and 7, the protective circuit shown in FIG. 8 may alternatively be connected across only part of the primary winding 18. The circuit shown in FIG. 8 includes a current-limiting resistor 73 and two zener diodes 62, 63 connected in series-opposition. As indicated by dashed lines, the zener diodes may be replaced by a varistor 71. The blocking voltage of the zener diodes or the varistor may be selected taking into account the highest voltage which should be permitted to occur across the primary winding 18. By means of this arrangement avalanche-like voltage and current surges are avoided with low output currents and/or high outputs voltages on the output terminals 24, 25 of the frequency converter, since, each time the thyristors 15, 16 are ignited the capacitors 19, 20 are rapidly discharged down to the blocking voltage of the zener diodes 62, 63 or the varistor 71 immediately the voltage across the primary winding exceeds said blocking voltage. In this way voltage and current wave forms such as those shown in FIG. 6 are obtained, in which $U_z'$ is equal to the blocking voltage of the zener diodes 62, 63 or the varistor 71.

Figure 9:
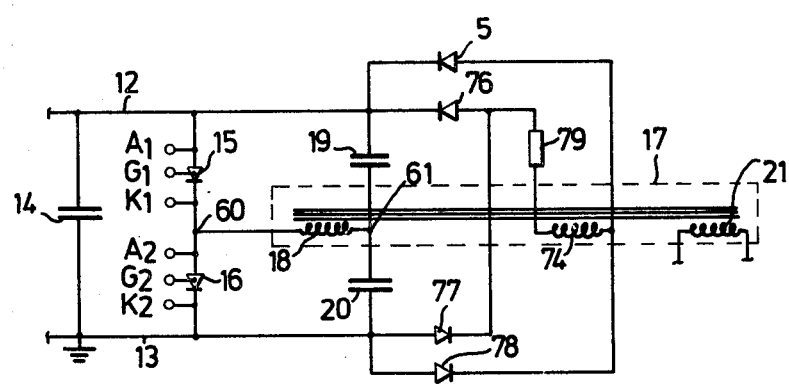

In the modification shown in FIG. 9, the protective circuit is connected to the end terminals of an additional secondary winding 74 of the transformer 17, the number of turns of the additional winding being equal to or somewhat lower, e.g. 0–30%, than the number of turns of the primary winding 18. The ends of the winding 74 are connected via a rectifier bridge 75-78 and a current limiting resistor 79 to a respective one of the input lines 12, 13. By means of this arrangement, avalanche-like voltage and current surges are avoided with low output currents and/or high output voltages on the output terminals 24, 25 of the frequency converter, since each time the thyristors 15, 16 are ignited, the winding 74 at excessive voltage at point 61 limits the transformer voltages by substantially loss-free backfeeding of current to the lines 12, 13. In this way voltage and current wave forms such as those shown in FIG. 6 are obtained, in which $U_z'$ is equal to the voltage difference between lines 12, 13 multiplied by the ratio between the number of turns of the primary winding 17 and the number of turns of the additional secondary winding 74, The relatively low voltage peak of short duration above $U_z'$ originates from the voltage drop across the protective resistor 79.

Figure 10:
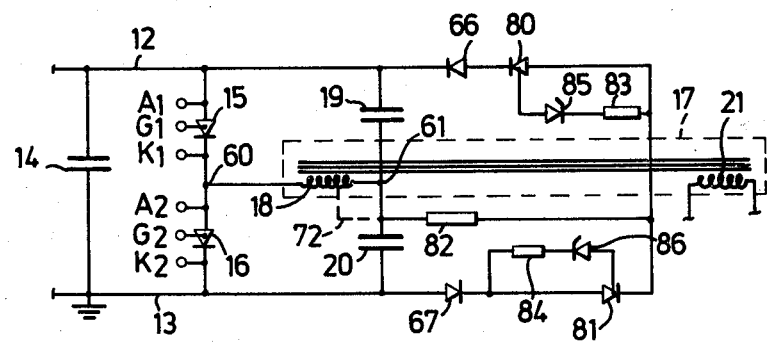

The voltage limiting means according to FIG. 10 comprises two circuits, each including a diode 66 or 67 and a thyristor 80 or 81. The circuits further comprise a common current limiting resistor 82. Each thyristor 80 or 81 is associated with an ignition circuit comprising a current limiting resistor 83 or 84 and a zener diode 85 or 86. The zener diodes 85, 86 may be replaced by varistors. The blocking voltage $U_z''$ of the zener diodes 85, 86 is selected so as to be somewhat lower than the highest voltage by which the voltage $U_{61}$ at point 61 may exceed the supply voltage on the lines 12, 13. Thus, when the voltage at point 61 exceeds the voltage on line 12 or falls short of the voltage on line 13 by an amount corresponding to the blocking voltage of the zener diodes 85, 86, the thyristor 80 or 81 is ignited so that current can flow from the point 61 through the circuit 82, 80, 66 to line 12 and with opposite polarity at point 61 can flow through the circuit 82, 81, 67 to line 13.

When using the protective circuits illustrated in FIG. 10, the voltage and current wave forms shown in FIG. 11 are obtained with a low load, i.e. a low output current and/or high output voltage on the output terminals 24, 25 of the frequency converter. As shown in FIG. 11, the voltage $U_{61}$ occurring at point 61 does not avalanche, but is substantially restricted to a value which exceeds the voltage on line 12 or 13 by an amount which corresponds to the blocking voltage $U_z''$ of the zener diodes 85, 86, with the exception of a relatively low voltage peak of short duration which originates from the voltage drop across the associated protective resistor 82. It will thus be understood, that the current and voltage pulses will not change with time in the avalanche manner shown in FIG. 4.

What we claim is:

1. A frequency converter of the series-capacitor type having small internal damping and comprising switching elements in the form of thyristors, said converter further comprising a transformer having a primary winding and at least one secondary winding, said primary winding being connected in series to at least one load capacitor, and a voltage limiting means for limiting the voltage across the transformer and said at least one load capacitor to a predetermined voltage value exceeding the supply voltage.

2. A frequency converter as claimed in claim 1, wherein the voltage limiting means comprises circuits connected between the common point of the capacitor circuit and the primary winding of the transformer and means for making said circuits conductive at a voltage which is equal to the difference beteween said predetermined voltage value and the supply voltage (FIGS. 1, 7 and 10).

3. A frequency converter as claimed in claim 2, wherein said means for making the circuits conductive comprise at least one zener diode or varistor in said circuits.

4. A frequency converter as claimed in claim 2, wherein each said circuit comprises a thyristor and means for igniting the thyristor at said predetermined voltage value.

5. A frequency converter as claimed in claim 4, wherein said ignition means comprises a zener diode or varistor connected between an input line of the supply voltage and the gate of the thyristor.

6. A frequency converter as claimed in claim 1, wherein the voltage limiting means comprises a circuit connected between terminals or points on one of the transformer windings, and means for making said circuit conductive at said predetermined voltage value.

7. A frequency converter as claimed in claim 6, wherein the voltage limiting means comprises a circuit connected in parallel with at least part of the primary winding of the transformer, and means for making said circuit conductive at said predetermined voltage value.

8. A frequency converter as claimed in claim 7, wherein said means for making the circuit conductive comprises two zener diodes connected in series opposition or a varistor in said circuit.

9. A frequency converter as claimed in claim 6, wherein said voltage limiting means comprises an additional secondary winding having a number of turns which is equal to or less than the number of turns of the primary winding, and wherein the end terminals of the additional secondary winding are connected via a rectifying bridge to a respective one of the input lines of the supply voltage.

10. A frequency converter as claimed in claim 1, wherein the voltage limiting means comprises circuits connected between a point on the primary winding of the transformer and a respective one of the input lines of the supply voltage and means for making said circuits conductive at a voltage which is equal to the difference between said predetermined voltage and the supply voltage (FIGS. 1, 7 and 10).

11. A frequency converter as claimed in claim 10, wherein said means for making the circuits conductive comprise at least one zener diode in said circuit.

12. A frequency converter as claimed in claim 10, wherein each said circuit comprises a thyristor and means for igniting said thyristor at said predetermined voltage value.

13. A frequency converter as claimed in claim 12, wherein said ignition means comprises a zener diode connected between an input line of the supply voltage and the gate of the thyristor.

* * * * *